June 28, 1960  E. M. DELORAINE ET AL  2,943,318
PULSE RADAR COUNTERMEASURE

Filed Aug. 5, 1942  2 Sheets-Sheet 1

INVENTORS
EDMOND M. DELORAINE
HENRI G. BUSIGNIES
BY
ATTORNEY

June 28, 1960
E. M. DELORAINE ET AL
2,943,318
PULSE RADAR COUNTERMEASURE
Filed Aug. 5, 1942
2 Sheets-Sheet 2
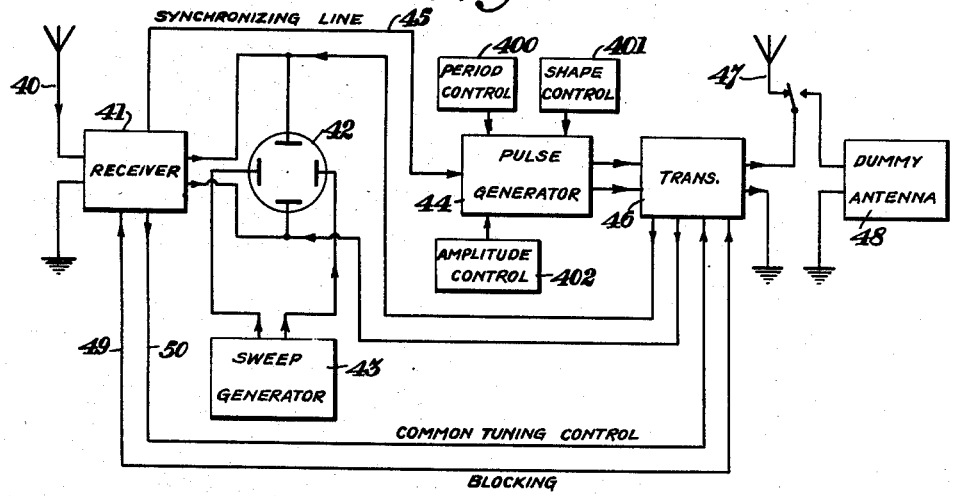
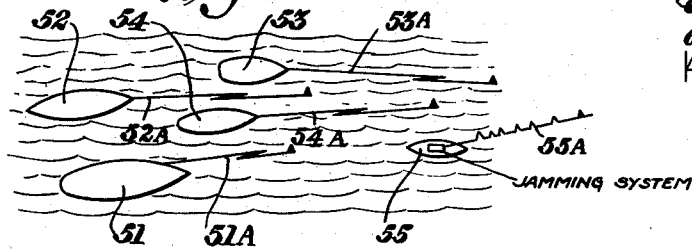
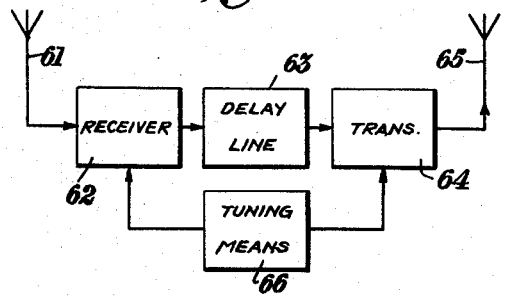
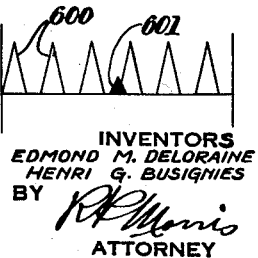
INVENTORS
EDMOND M. DELORAINE
HENRI G. BUSIGNIES
BY
ATTORNEY United States Patent Office 2,943,318
Patented June 28, 1960

2,943,318

PULSE RADAR COUNTERMEASURE

Edmond M. Deloraine, New York, and Henri G. Busignies, Forest Hills, N.Y., assignors to International Telephone and Telegraph Corporation, a corporation of Maryland Filed Aug. 5, 1942, Ser. No. 453,668

12 Claims. (Cl. 343—18)

This invention relates to radio receiving and transmitting systems and more particularly to radio receiving and transmitting systems designed for obscuring unwanted position indicating signals.

Particularly in times of war, it is often desired to prevent enemy units from effectively operating locating apparatus. A known form of position indicating or location indicating apparatus comprises transmitting and receiving arrangements such as can be used for obstacle detection. In these systems the location of the object is determined by the timing of a reflection of a pulse. In order to prevent effective position finding by this method, it is desirable to transmit from the reflecting point or from some other point adjacent thereto radio signals which will serve to render the indications of the true reflecting point of little value to the enemy.

In the copending application of Emile Labin, Serial No. 451,302, filed July 17, 1942, now Patent No. 2,412,991, a jamming system for interfering with pulse communication is disclosed. In this prior application, however, the blanketing or jamming of the enemy stations is accomplished purely by brute force, that is, by making the interfering transmissions of such high amplitude as to substantially blanket out communications.

It is a principal object of our invention to accomplish the substantial obliteration or obscuring of a distance determining pulse indication without necessitating such great expenditures of power as is required in the proposed system.

It is a further object of our invention to transmit a series of impulses within the spacing period of received pulses intended for reflection which will tend to obscure on an enemy cathode ray receiver the true reflected pulse.

It is a still further object of our invention to provide a transmitter arrangement which will transmit a series of pulses simulating in shape and amplitude the undesired reflected pulse shape in order that this reflected pulse may be obscured at the indicator.

A better understanding of our invention as well as the objects and features thereof may be had from the particular description thereof made with reference to the accompanying drawings in which:

Fig. 4 is a diagrammatic illustration of another embodiment of our invention;

Fig. 5 is an illustration of the application of our invention to the protection of a fleet of craft;

Fig. 5A is a curve used in explaining the operation of Fig. 5;

Fig. 6 is a simplified apparatus illustrating a simple embodiment of our invention; and Fig. 6A is a curve illustrating the operation of the system of Fig. 6.

Figure 1:
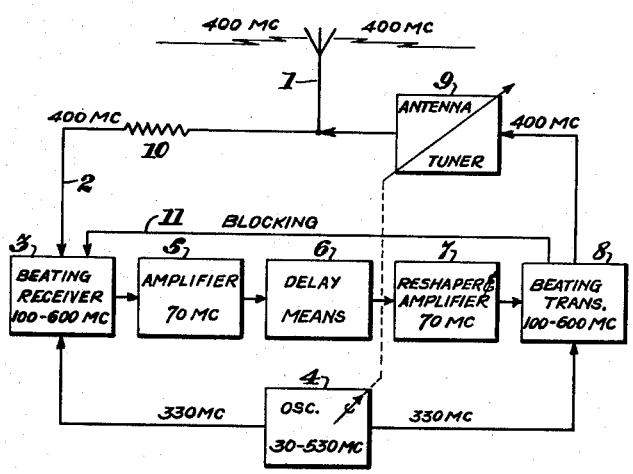
Fig. 1 represents a schematic diagram of one form of radio system in accordance with my invention.

Turning first to Fig. 1 which shows a simplified block diagram with single lines interconnecting the blocks, the single lines interconnecting the blocks may represent two lines or more which may be actually used in making the connections. Since the particular type of coupling lines forms no part in our invention, the simplified showing is considered preferable for the purpose of illustration. Incoming signals are received on an antenna 1 and are transmitted over line 2 to receiving apparatus 3. Receiver 3 is a tunable receiver which is intended to be tuned over a frequency range for the purpose of detecting and indicating the presence of transmitted enemy signals. This receiver may, for example, be of a continuously tunable type such as disclosed in the above-mentioned Emile Labin application, Serial No. 451,302. Signals received on receiver 3 may be beat down to a common intermediate frequency by means of oscillations from tunable oscillator 4. These signals are then amplified in amplifier 5 and after passing through delay means 6 are applied to a reshaper and amplifier 7. Reshaper and amplifier 7 is preferably adjustable so that the impulses therein may be made of substantially the same amplitude and shape as the signals indicated in receiver 3. These reshaped impulses are then applied to transmitter 8 where they are raised to the same frequency as the received signals by beating with output oscillations from oscillator 4 after which they are applied to antenna 1 for retransmission. An antenna tuning circuit is shown at 9 preferably adjusted together with tuning oscillator 4 so that the antenna is tuned for the transmitted signals. For the received signals the antenna need not be so carefully tuned and may be rendered substantially periodic over a relatively wide signal band by suitable means as indicated by resistor 10.

In order that the transmitted signals be prevented from interacting adversely on the receiver, a blocking line 11 is provided interconnecting transmitter 8 and receiver 3. Blocking signals are derived from transmitter 8 in a blocking circuit which may be built into either the transmitter or receiver. Any of the well known blocking systems may be used to substantially prevent reception during the transmission of energy from transmitter 8. A suitable blocking arrangement may be of the type illustrated in the aforementioned application of Emile Labin, Serial No. 451,302.

Figure 2:
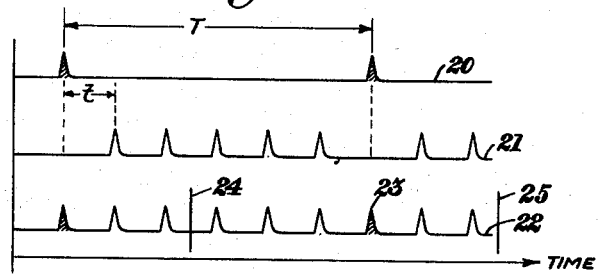
Fig. 2 is a set of curves explaining the operation of the system of Fig. 1.

As an illustration of the operation of the circuit, we may assume that the enemy station is transmitting at a frequency of 400 megacycles. These 400 megacycle signals are received on receiver 3 and may produce peaks on the indicator at receiver 3, the peaks being separated from one another by period T as shown in Fig. 2, curve 20. After a delay of $t$ the first of the repeated signals is transmitted from the antenna 1 of Fig. 1 at the same carrier frequency. The delay $t$ must be sufficient so that receiver 3 is cut off before transmission of the repeated signal takes place. Preferably, a series of impulses are repeated during the period T as indicated in curve 21 of Fig. 2. On the indicator at the enemy transmitter there will then be received a series of peak indications representing repeated impulses as well as the reflected pulses such as shown in curve 22 of Fig. 2. In this figure the actual reflected pulses are shown shaded whereas the simulated pulses from transmitter 8 are shown as open peaks. If the reflecting craft is at such a position that the peak 23 appears at the position shown between lines 24 and 25 of the oscillograph on the enemy craft, it is apparent that the location of the reflecting object cannot be readily observed. In fact, it may probably be assumed that the first indicated peak is the proper one and the enemy will therefore be misled. In any event, it will be very difficult to observe which one of the pulses shown on the screen is the true reflected pulse.

Because of the repetition of the series of impulses, there will be impulse peaks appearing in front of the actual reflected pulse indication on the screen as well as behind it so long as the enemy obstacle detection system operates on a fixed period T between pulses. Of course, if the spacing is varied at the enemy transmitter, then it may be possible to locate this reflected pulse by the fact that it varies in position with respect to the jamming or obscuring impulses. However, many of the present installations operate with fixed periods between pulses of the obstacle detection apparatus and in such cases the system described above is wholly effective.

Figure 3:
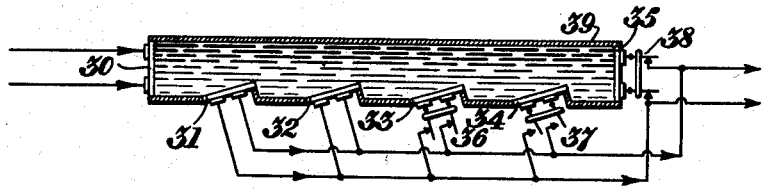
Fig. 3 is an illustration of one of the units of the system shown in Fig. 1.

Preferably, delay means 6 of Fig. 1 is made in such a way that the received pulses will be delayed a number of different periods in time. In this way the single received pulses may serve to produce a train of impulses as shown in curve 21 of Fig. 2. The delay means preferably is adjustable so that all of the repeated or reproduced impulses will follow within the period T of the transmitted pulses and none of them will follow too closely the received pulse which is used for reflection. This delay means may constitute a plurality of delay filters which are made individually adjustable to control the amount of delay. In Fig. 3, however, is shown one suitable form of delay means which will serve to delay impulses variable amounts of time with a minimum of distortion. This network comprises a cartridge or shell 39 filled with a wave transmitting fluid. This fluid may be some form of oil sufficiently thin to transmit very high frequency waves. The incoming waves are applied to the liquid column by means of a piezo electric crystal 30. A plurality of output piezo electric crystal arrangements 31 to 35 inclusive are provided. The input pulses will then be delayed increasingly longer periods of time at crystals 31, 32, 33, 34 and 35. Thus a series of impulses having different time delays are derived at the output of the delay means. It is clear that in actual construction it may be desirable to include many more crystals than the five shown in the example. In order that the line may be effectively adjustable in length so that none of the delayed impulses will follow outside the period T certain of the crystal arrangements may be provided with switches 36, 37 and 38 which may be controlled at will to omit certain of the impulses from the output circuit. It should be also distinctly understood that any irregular spacing of the piezo crystal elements on the output side may be provided instead of the regular arrangement shown in Fig. 3. This random arrangement of the delay periods may be preferable since they will then not produce a regular pattern on the enemy oscillograph.

In Fig. 4 is shown an alternative arrangement. In this system received pulses are applied to receiver 41 over antenna 40. These received pulses after detection are applied to the deflecting electrodes of an oscillograph 42 controlled by a sweep generator 43, so that the size and shape of the received pulse as well as its period of recurrence may be observed. An impulse generator is provided at 44 synchronized with receiver 41 over synchronizing line 45. The pulse signals from the generator are applied to transmitter 46 from which they are transmitted over antenna 47. Before transmission, however, transmitter 46 is preferably connected to a dummy antenna or load 48 while adjustments are being made. The impulses from transmitter 46 are applied to the deflecting electrodes of oscillograph 42 so that the shape of the impulse to be transmitted may be compared with the received pulse. Impulse generator 44 is provided with adjustable controls such as period control means 400, shape control means 401 and amplitude control means 402. Each of these controls may be of well known construction and are adjusted until the generated impulse simulates as near as possible in size and shape the received pulse. At the same time the period of repetition is controlled so that repetition of the impulse may be made equal to a submultiple of the period of the received pulses. After this adjustment is made, transmitter 46 is coupled to antenna 47 so that the impulses may be transmitted and serve to obscure the reflected pulses at the enemy indicator. Suitable blocking means 49 may be provided to block receiver 41 during the operation of transmitter 46. Likewise, a common tuning control 50 may be applied to tune the transmitter in common with the receiver to the desired carrier frequency. This common tuning control may be of any desired type, for example, it may be of the common oscillator type shown in Fig. 1 or it may be of some other mechanical type such as illustrated in the aforementioned Emile Labin application, Serial No. 451,302. It should also be understood that a common oscillograph indicator such as shown at 42 may be used in the circuit of Fig. 1 in order that the repeater impulses may be controlled in shape to simulate the received pulses.

While the system outlined above may be applied to any ship or other craft it is desired to detect, it is often desirable that the jamming or obscuring apparatus be mounted on some lighter craft so that even if the craft is located it will still serve to protect other larger and more important craft until such time as it has been disabled. In Fig. 5 is shown a diagram of a fleet of vessels 51, 52, 53 and 54 protected by a small boat 55 carrying on board a jamming system. The transmitted pulses from the enemy radio locator will be reflected from each of the craft as represented by the line 51A to 55A inclusive. However, 55A in addition to showing the reflected pulse, shown shaded, produces a plurality of transmitted impulses shown in open lines. Thus, the indications on an enemy indicator screen may be as shown in Fig. 5A. The first small reflected pulse 60, shown shaded, corresponds to the pulse reflected from craft 55. The other shaded pulses 56, 57, 58 and 59 correspond to the reflected pulses from the craft 53, 54, 52 and 51, respectively. The open line pulses are the simulated jamming pulses from small craft 55. It will, therefore, be clear that the indicator screen will be so obscured by a plurality of pulses that it will not be possible to locate any one of the craft thereby protected. Furthermore, since craft 55 is smaller than the others, the first reflection 60 may be quite small and will not appear of any great importance. Accordingly, even if the pulses from the enemy transmitter are variable in periodicity only the leading craft 55 will be located and the entire important fleet will be protected thereby.

In many cases it may be desirable to use a low flying aircraft to carry the jamming stations which craft will preferably be in advance of the fleet so that all indications received on the enemy craft will indicate that the fleet of vessels is much closer than they actually are.

In the preferred embodiments so far described, attempt has been made to simulate the reflected pulses in size and shape. By use of this precise simulation no greater power need be used in the transmitter than is just sufficient to simulate the reflected power of the craft. In some instances it may be desirable, however, to transmit a series of controlled impulses of much greater amplitude than the reflected pulse and attempt to completely jam or obscure the screen of the enemy oscillograph for all reflected pulses. For this purpose a transmitter of the type shown in Fig. 1 may be used in which the reshaper and amplifier 7 is replaced by an amplifier which serves only to amplify the pulses to a desired level. A much simpler arrangement for this type of jamming, however, is disclosed in Fig. 6. In this figure pulses are received on antenna 61 transferred to receiver 62 and after a delay in line 63 are applied to transmitter 64 from whence they are transmitted as jamming impulses over transmitting antenna 65. Delay means 63 may be adjusted to any desired value so that signals received on antenna 61 may be repeated an adjustable period of time after receipt. No blocking is provided between transmitter 64 and receiver 62. As a consequence, the impulses transmitted from 65 also are received on antenna 61 and repeated for retransmission. Thus, the system produces a series of impulses at predetermined spaced intervals determined by delay line 63. A common tuning means 66 may be provided for simultaneously tuning the receiver and transmitter to the same frequency.

With this system, the enemy oscillograph may produce indications similar to those shown in Fig. 6A. In this figure a plurality of high substantially equally spaced peaks 600 are produced on the screen and substantially blanket or jam the single received pulse 601 which is produced on the screen by reflection. If desired, a blocking signal from transmitter 64 to receiver 62 may be applied to block the receiver between impulses in order that the enemy signals may be observed in the period between impulses. Such blocking systems are well known and need not be specifically illustrated. On the enemy screen the large impulses will tend to spread out and thereby cover the whole screen substantially obscuring the true reflections.

It is clear that in accordance with the principles of our invention many modifications other than those described above may be made without departing from the spirit thereof. Furthermore, it is contemplated that any of the parts illustrated in the separate systems may be interchanged at will so long as continuity of the system is preserved. The illustrations given are not intended as any limitations on the scope of our invention but merely as illustration of preferred forms of the invention.

What is claimed is:

1. A jamming system for obscuring pulses produced by reflection of a series of spaced transmitted pulses from objects it is desired to protect, comprising means for receiving said transmitted pulses, means at said receiver for determining the carrier frequency of said received pulses, producing means for producing impulses for retransmission, means for controlling production of said impulses for producing a plurality of said pulses intermediate said received pulses, and means for transmitting said produced impulses on a carrier frequency the same as that of said received pulses to obscure undesired indications of said reflected pulses.

2. A jamming system for obscuring pulses produced by reflection of transmitted pulses from objects it is desired to protect, comprising means for receiving said transmitted pulses, means at said receiver for determining the carrier frequency of said received pulses, producing means for producing impulses of similar form to said transmitted pulses, means for controlling production of said impulses in timed relation with respect to the receipt of said pulses, and means for transmitting said produced impulses on a carrier frequency the same as that of said received pulses to obscure undesired indications of said reflected pulses.

3. A jamming system according to claim 2 wherein said means for producing impulses comprises repeater means for said received pulses, and intermediate frequency means in said repeater means operating at a fixed intermediate frequency, further comprising common control means including a beat oscillator, means for tuning said beat oscillator to a frequency differing from said received frequency by said intermediate frequency, means for applying the output of said beat oscillator to said receiver to produce said intermediate frequency, and means for applying the output of said beat oscillator to the output of said intermediate frequency means to reproduce said received carrier frequency for retransmission, whereby tuning of said oscillator serves as a common tuning control for said receiver and transmitter.

4. A jamming system for obscuring pulses produced by reflection of transmitted pulses from objects it is desired to protect, comprising means for receiving said transmitted pulses, means at said receiver for determining the carrier frequency of said received pulses, a radio transmitter tuned to said carrier frequency, means for causing operation of said transmitter in response to received pulses to cause transmission of an impulse at higher level than each said received pulse, said receiver operating in response to receipt of each transmitted impulse to cause transmission of other impulses, whereby said receiver and transmitter cooperate to produce and transmit a series of impulses in response to said received pulse.

5. A jamming system for obscuring pulses produced by reflection of transmitted pulses from objects it is desired to protect, comprising means for receiving said transmitted pulses, means at said receiver for determining the carrier frequency, the spacing period and shape of said received pulses, impulse producing means for producing impulses having a carrier frequency and shape substantially the same as that of said transmitted pulses, and a period equal to a sub-multiple of said spacing period, means for controlling production of said impulses in timed relation to the receipt of said pulses, and transmitting means for transmitting said produced impulses to obscure undesired indications of said reflected impulses.

6. A jamming system according to claim 5, wherein said impulse producing means comprises an impulse oscillator, means for separately adjusting the period of said oscillator and the shape of waves produced therein, a carrier frequency oscillator, means for tuning said oscillator to the carrier frequency of said received pulses and means for modulating said carrier in response to said produced and shaped impulses.

7. A jamming station according to claim 5, wherein said producing means comprises a multiple delay means for delaying received impulses different amounts, shaping means for shaping each of said delayed impulses, and means for applying said delayed shaped impulses to said transmitter for controlling its operation.

8. A jamming system according to claim 5, wherein said impulse producing means comprises repeater means for said received pulses, and intermediate frequency operating means in said repeater means operating at a fixed intermediate frequency, further comprising common control means including a beat oscillator, means for tuning said beat oscillator to a frequency different from said received frequency by said intermediate frequency, means for applying the output of said beat oscillator to said receiver to produce said intermediate frequency, and means for applying the output of said beat oscillator to the output of said intermediate frequency operating means to produce said received carrier frequency for retransmission, whereby tuning of said oscillator serves as a common tuning control for said receiver and transmitter.

9. A jamming system according to claim 5, further comprising a dummy antenna, a radiating antenna, switch means for coupling said transmitting means to said antenna while adjusting the shape and period of said transmitted pulses, and means for coupling said transmitter to said radiating antenna after such adjustment.

10. A method of jamming stations to obscure reflected impulses formed by reflection of pulses from objects it is desired to protect comprising receiving said pulses and determining their period of spacing, their shape and their carrier frequency, locally producing impulses, synchronizing production of said impulses with receipt of said pulses, controlling the shape of said impulses to simulate said pulses, controlling the period of said impulses with respect to the period of said pulses, and radiating said impulses after shaping and spacing on said carrier frequency.

11. A method of jamming stations to obscure reflected impulses formed by reflection of pulses from objects it is desired to protect comprising receiving said pulses and determining their period of spacing and their carrier frequency, locally producing a plurality of impulses within said determined periods, controlling the period of said impulses with respect to the period of said pulses, and radiating said impulses on said carrier frequency.

12. The method of protecting an object by obscuring the reflection therefrom of pulses transmitted from a remote position, comprising receiving said pulses, determining the carrier frequency of said pulses, determining the time interval between said pulses, and transmitting on said carrier frequency a plurality of impulses within said time interval.

References Cited in the file of this patent

UNITED STATES PATENTS 2,241,933  Roberts _____ May 13, 1931